United States Patent
Fiveland

(10) Patent No.: US 7,398,743 B2
(45) Date of Patent: Jul. 15, 2008

(54) COMPRESSION IGNITION INITIATION DEVICE AND INTERNAL COMBUSTION ENGINE USING SAME

(75) Inventor: Scott B. Fiveland, East Norwich, NY (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/318,861

(22) Filed: Dec. 27, 2005

(65) Prior Publication Data

US 2007/0144459 A1    Jun. 28, 2007

(51) Int. Cl.
*F02B 19/18*    (2006.01)

(52) U.S. Cl. .................. 123/3; 123/143 B; 123/286

(58) Field of Classification Search .............. 123/1 A, 123/3, 143 B, 286
See application file for complete search history.

(56) References Cited

U.S. PATENT DOCUMENTS

| | | | |
|---|---|---|---|
| 2,826,187 A | | 3/1958 | Meyer |
| 4,140,090 A | * | 2/1979 | Lindberg ............... 123/1 A |
| 4,167,930 A | * | 9/1979 | McNair, Jr. ............ 123/286 |
| 4,203,393 A | * | 5/1980 | Giardini .............. 123/143 B |
| 4,221,198 A | * | 9/1980 | McNair, Jr. ............ 123/286 |
| 4,300,497 A | * | 11/1981 | Webber ................ 123/254 |
| 4,364,342 A | | 12/1982 | Asik |
| 5,024,193 A | * | 6/1991 | Graze, Jr. .............. 123/259 |
| 5,611,307 A | * | 3/1997 | Watson ................. 123/254 |
| 5,799,634 A | * | 9/1998 | Shifflette ............ 123/169 R |
| 6,032,617 A | | 3/2000 | Willi et al. |
| 6,213,086 B1 | | 4/2001 | Chmela et al. |
| 6,230,683 B1 | | 5/2001 | Zur Loye et al. |
| 6,276,334 B1 | | 8/2001 | Flynn et al. |
| 6,286,482 B1 | | 9/2001 | Flynn et al. |
| 6,386,177 B2 | | 5/2002 | Urushihara et al. |
| 6,390,054 B1 | | 5/2002 | Yang |
| 6,463,907 B1 | | 10/2002 | Hiltner |
| 6,561,157 B2 | | 5/2003 | Zur Loye et al. |
| 6,595,181 B2 | | 7/2003 | Najt et al. |
| 6,668,788 B2 | | 12/2003 | Agama et al. |
| 6,684,849 B2 | | 2/2004 | Zur Loye et al. |
| 6,725,825 B1 | | 4/2004 | Kurtz et al. |
| 6,752,104 B2 | | 6/2004 | Fiveland et al. |
| 6,769,392 B2 | | 8/2004 | Lawrence et al. |
| 2002/0059907 A1 | | 5/2002 | Thomas |
| 2003/0066498 A1 | | 4/2003 | Guy |
| 2004/0123849 A1 | | 7/2004 | Bryant |

FOREIGN PATENT DOCUMENTS

| | | | |
|---|---|---|---|
| JP | 52-63515 | | 11/1975 |
| JP | 55-96368 | | 7/1980 |
| JP | 2001-152859 | * | 6/2001 |

* cited by examiner

*Primary Examiner*—T. M. Argenbright
(74) *Attorney, Agent, or Firm*—Liell & McNeil

(57) ABSTRACT

An internal combustion engine having a compression ignition initiation device is provided. The compression ignition initiation device includes a body defining a chamber and an outlet from the chamber. The device further includes means, within the chamber, for generating a combustion initiating shock front from the outlet. A method is provided, including compressing a mixture of fuel and air in an internal combustion engine cylinder to a point less than a compression ignition threshold, and initiating ignition of the mixture by subjecting it to a shock front.

19 Claims, 2 Drawing Sheets

US 7,398,743 B2

COMPRESSION IGNITION INITIATION DEVICE AND INTERNAL COMBUSTION ENGINE USING SAME

TECHNICAL FIELD

The present disclosure relates generally to internal combustion engines that ignite a premixed charge of fuel and air, and relates more particularly to a compression ignition initiation device for use in such an internal combustion engine.

BACKGROUND

Internal combustion engine technology continues to advance. Improvements in reliability, emissions quality and fuel efficiency are revealed on an almost daily basis. Over the last several decades, particular attention has been paid to technologies capable of reducing the levels of certain emissions in exhaust from internal combustion engines. One class of emissions compounds of special interest is known in the art as "NOx", and includes various nitrogen-oxygen compounds. Various schemes have been proposed over the years for operating internal combustion engines such that the relative quantities of NOx in the engine exhaust are reduced. One approach showing much promise involves running the engine relatively lean, such that the amount of fuel in the mixture combusted in the cylinder is less than a stoichiometric amount of fuel.

One particular type of engine technology capable of lean burning operation that has received much attention in recent years is known in the art by various names such as homogenous charge, or premixed charge compression ignition, or "HCCI". In HCCI operation, fuel is typically delivered to an engine cylinder relatively early in an engine cycle, such that there is relatively more time available for mixing of the fuel and air prior to ignition and combustion. Once within the cylinder, the fuel and air mixture is compressed until autoignition commences. The relatively greater amount of time available for the fuel and air to mix tends to result in a more rapid heat release than in conventional engines. In conventional compression ignition engines, the rate of heat release is controlled in part by the rate of fuel injection, whereas in spark ignited engines, heat release is controlled in part by a finite turbulent flame propagation traversing the combustion space. HCCI operation has neither of these natural controls.

While homogeneous charge operation has shown great potential for NOx reduction, there is still room for improvement. In the context of compression ignition engines in particular, there is a limit as to how lean the fuel and air mixture may be, while still reliably autoigniting. Cylinder pressures sufficient to induce autoignition of lean charges can be impracticable with conventional hardware. Moreover, many HCCI engines are only able to operate across a portion of their theoretical load range, due at least in part to the relatively high pressure spikes which can result from the rapid, fairly uniform ignition of the fuel and air mixture throughout the cylinder. In particular, the relatively larger amounts of combusting fuel necessary to accommodate larger loads can simply create more pressure than the engine components can withstand.

A further challenge to HCCI engine designers relates to the difficulty in autoigniting a fuel and air mixture at a desired time. HCCI engines lack a natural control mechanism for ignition timing, such as the spark timing and fuel injection timing of spark ignited and conventional compression ignition engines, respectively. Moreover, ignition timing in HCCI tends to be sensitive to speed and load changes, combustion characteristics of previous engine cycles, and the specific fuel formulation and decomposition properties. As much of the potential of HCCI strategies for improved emissions quality relies upon igniting a lean mixture at a prescribed time such as at or near top dead center, the technology has yet to fulfill certain of its promises.

One attempt at improving lean burning engine operation is known from U.S. Pat. No. 6,595,181 to Najt et al. Najt utilizes an engine operating scheme wherein a pulse jet of reacting fuel mixture from a pre-chamber mixes with an ultra dilute premixed fuel-air charge in a main chamber. After the charge has partially combusted, rapidly expanding combustion gases ignite the remaining ultra dilute mixture by compression ignition. In other words, in Najt et al. there appears to be an initial flame from the pulse jet which thereafter ignites sufficient fuel to raise the in-cylinder pressure to a level sufficient for compression ignition. While Najt et al. provides one means that may have applications in certain systems, the design has various drawbacks. For instance, only a portion of the charge can achieve the advantages typical of HCCI operation. Furthermore, to the extent that any true HCCI operation is possible with Najt et al., at higher speeds and loads the engine must switch over to a conventional combustion regime.

The present disclosure is directed to overcoming one of more of the problems or shortcomings set forth above.

SUMMARY OF THE DISCLOSURE

In one aspect, the present disclosure provides a compression ignition initiation device for an internal combustion engine. The device includes a body defining a chamber and an outlet from the chamber, and means, within the chamber, for generating a combustion-initiating shock front from the outlet.

In another aspect, the present disclosure provides an engine housing defining at least one cylinder. A compression ignition initiation device is coupled with the at least one cylinder, and includes a combustion-initiating shock front generator fluidly connected with the at least one cylinder.

In still another aspect, the present disclosure provides a method of operating an internal combustion engine. The method includes a step of compressing a mixture of fuel and air in an internal combustion engine cylinder to a point less than a compression ignition threshold. The method further includes a step of initiating ignition of the mixture at least in part by subjecting the mixture of fuel and air to a shock front.

DETAILED DESCRIPTION

Figure 1:
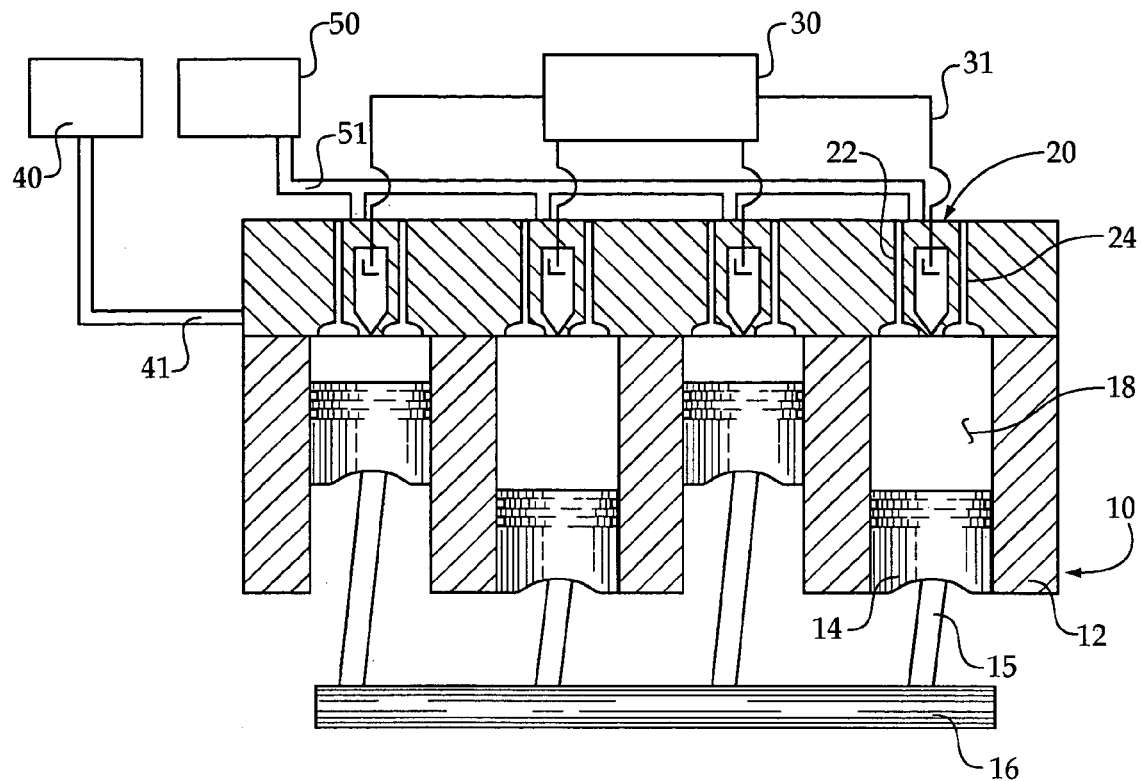
FIG. 1 is a partially sectioned side view of an internal combustion engine according to the present disclosure.

Referring to FIG. 1, there is shown a partially sectioned side view of an engine 10 according to the present disclosure. Engine 10 includes a housing 12 having at least one cylinder 18, for example, a plurality of cylinders disposed therein. A piston 14 is moveably positioned within each cylinder 18, and connects with a crankshaft 16 via a rod 15. A first gas exchange valve 22, and a second gas exchange valve 24 are typically disposed in housing 12, and operable to control exhaust and intake of each respective cylinder 18 in a conventional manner. By controlling the opening/closing timings of valves 22 and 24, the compression ratio within each cylinder 18 may also be varied, as is well known in the art.

A fuel supply 40 connects with housing 12 via a primary fuel supply line 41. A fuel reformer 50, described herein, may also be connected with fuel supply 40 and with engine housing 12 via a secondary fuel supply line 51. A compression ignition initiation device 20 will typically be coupled with each cylinder 18 to initiate compression ignition therein. An electronic controller 30 may be in control communication with each compression ignition initiation device 20 via a communication line(s) 31, and may also be in control communication with valves 22 and 24, and other components of engine 10 in a well known manner. Engine 10 will be a compression ignition engine such as a gaseous fuel or diesel engine, and may be a fuel injected engine such as a direct injected or port injected engine.

Figure 2:
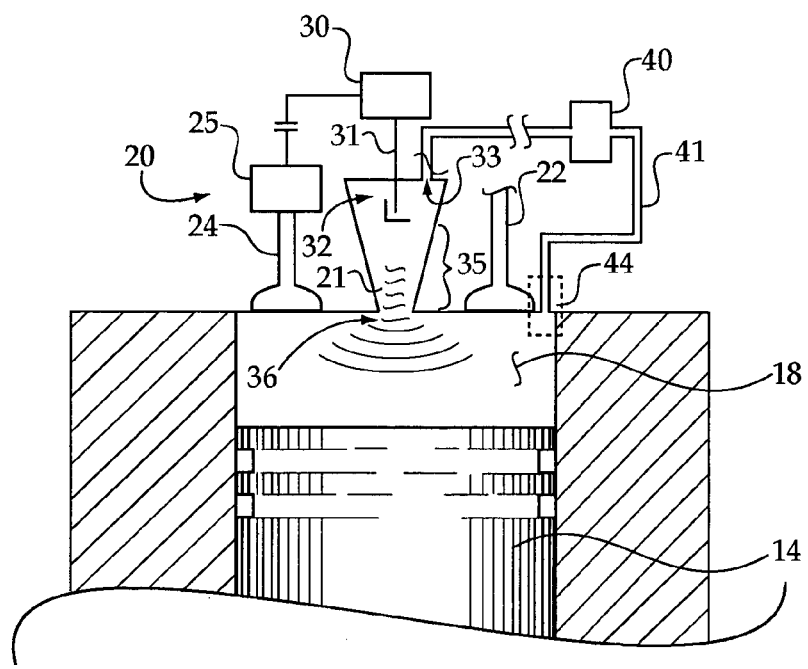
FIG. 2 is a partially sectioned side view of a portion of the engine of FIG. 1.

Referring also to FIG. 2, there is shown a portion of engine 10, including a compression ignition initiation device 20 in more detail. In FIG. 2, fuel supply 40 is shown connecting with cylinder 18 via a fuel injector 44 disposed partially therein, although it should be appreciated that embodiments are contemplated which do not use the illustrated fuel injected design. Each compression ignition initiation device 20 will typically include a body 21 defining a prechamber 34. A fuel inlet 33 will typically be disposed in body 21 such that fuel may be delivered from reformer 50 to prechamber 34. The fuel supplied via inlet 33 from reformer 50 may be a reformed hydrocarbon fuel such as syngas, and will typically be a relatively more reactive fuel type than the fuel in fuel supply 40. Thus, reformer 50 may be a porous combuster to produce syngas from natural gas or petroleum distillate fuel in a manner well known in the art. Other fuel types and/or sources or plumbing schemes might be used without departing from the scope of the present disclosure. For instance, rather than reforming a fuel from the main engine fuel supply, a separate fuel tank for the relatively more reactive fuel supplied to device 20 might be used.

An outlet 36 fluidly connects prechamber 34 with cylinder 18 via a throat 35 having a converging geometry in a direction of outlet 36. It should be appreciated that throat 35 is illustrated schematically in FIG. 2, and might have a variety of geometries such as an abrupt contraction in diameter proximate outlet 36. Compression ignition initiation device includes the described throat geometry to facilitate the generation of a shock front in a region proximate outlet 36, which initiates compression ignition of a fuel and air mixture in cylinder 18, as described herein.

Combustion of fuel delivered to pre-chamber 34 may be initiated via a spark generating means 32 having a spark gap within pre-chamber 34, which might be a multiple spark gap device extending into prechamber 34 to allow selective ignition as dictated by electronic controller 30. Accordingly, timing of combustion within pre-chamber 34 and consequent generation of the shock front from outlet 36 to cylinder 18 may be precisely timed. The combustion-initiating shock front will initiate compression ignition of the fuel and air mixture in cylinder 18 beginning at outlet 36 and cascading thereafter through the entire charge as the shock wave propagates outwardly.

The present disclosure further includes a method of operating an internal combustion engine. The method may include the step of compressing a mixture of fuel and air in engine 10 to a point less than a compression ignition threshold. Compression of the fuel and air mixture may take place in a conventional manner via piston 14, and the actual compression degree may be controlled, for instance, by adjusting the position of one or both of valves 22 and 24 in a known manner. For instance, a known variable intake or exhaust valve actuator and method may be used to control compression level of the fuel/air mixture in cylinder 18. One example of a suitable variable valve timing scheme is taught in U.S. Pat. No. 6,769,392 to Angelino et al., entitled "Variable Valve Timing In A Homogeneous Charge Compression Ignition Engine." In particular, engine 10 may also include at least one electro-hydraulic assist actuator 25 coupled with at least one of valves 22 and 24 which is capable of mechanically engaging the valve and controlling its position at least partially independently of a cam and/or piston position. Actuator 25 may in turn be operably coupled with electronic controller 30. It is further contemplated that the compression ratio of the fuel and air mixture may be varied based on certain engine operating factors, such as load. For instance, in a lower load portion of a load range of engine 10, the compression of the mixture of fuel and air will typically be relatively closer to an autoignition threshold than in a higher load portion of the range. Those skilled in the art will be familiar with the relatively greater ease of compression igniting fuel and air mixtures when operating at relatively higher loads.

The method may further include the step of initiating ignition of the mixture at least in part by subjecting the mixture of fuel and air to a shock front generated, for example, by compression ignition initiation device 20. While spark-ignited internal combustion of a fuel within prechamber 34 is contemplated to be one practical implementation strategy, those skilled in the art will appreciate that other means are possible for generating a shock front. Rather than spark-ignited combustion via spark generating means 32, combustion in prechamber 34 might be initiated via compression ignition, for example using a separate compression piston in the prechamber for that purpose. The shock front from pre-chamber 34 will typically also be generated in part by forcing a convergence of rapidly expanding combustion products via the geometry of throat 35. It should be appreciated, however, that the present disclosure also contemplates non-pre-chamber combustion strategies for generating a shock front, such as via some other release of compressed gas.

INDUSTRIAL APPLICABILITY

Referring to the drawing Figures generally, when it is desirable to initiate compression ignition in cylinder 18, electronic controller 30 will generate an electric potential at the spark gap of spark generating means 32 in a conventional manner. Fuel such as syngas fuel delivered to prechamber 34 via fuel inlet 33 may thus be ignited in prechamber 34. The primary fuel will typically be injected or otherwise delivered to cylinder 18 prior to ignition of the secondary fuel in prechamber 18. In general terms, compression of the mixture of fuel and air in cylinder 18 will be to a point that is less than an autoignition threshold thereof. The compression, however, may be greater than what would be considered acceptable for stable combustion in a spark-ignited engine. In other words, although the present disclosure is not thereby limited, the relative degree of compression of the fuel and air mixture may be greater than a compression level used in a spark-ignited engine, which typically depends on avoiding engine knock.

It is contemplated that in many instances, spark ignition within compression ignition initiation device 20 will take place at a selected timing, such as when piston 14 is near a top dead center position. However, in other instances ignition of the fuel charge within prechamber 34 could be chosen to take place before or after piston 14 is at a top dead center position in a given engine cycle. Spark ignition of the fuel charge in prechamber 34 will generate an expanding pocket of combustion products in prechamber 34. The expanding combustion products will encounter the pressure focusing converging geometry of throat 35 as they rapidly travel toward outlet 36, ultimately creating a shock front at approximately the interface of outlet 36 with cylinder 18.

The shock front generated proximate outlet 36 will rapidly propagate outwardly through the fuel and air mixture in cylinder 18. Propagation of the shock front may be thought of as comprising a pressure wave that induces localized compression ignition zones of the fuel and air mixture in an outwardly expanding pattern from outlet 36. Compression of the fuel and air mixture by the shock front will be sufficient to locally induce compression ignition thereof. In general, but not limiting terms, the increase in pressure due to the shock front will happen more rapidly than pressure increases due to piston motion during engine operation.

As described herein, the fuel and air mixture that is delivered to cylinder 18 may be compressed via piston 14 to a point that is less than its autoignition threshold. The additional compression from the shock front will further compress the fuel and air mixture at least to a point that is sufficient to induce compression ignition. The additional compression of the fuel and air mixture provided by the shock front in cylinder 18 allows operation of engine 10 with a leaner fuel and air mixture than was possible in many earlier designs. Known designs have been limited by the capability of conventional engines to compress a lean fuel and air mixture to a point sufficient to induce compression ignition, as relatively lower fuel to air ratios typically require relatively greater compression levels to autoignite the mixture. Relatively leaner operation can result in a reduction in certain pollutants, particularly NOx, and is thus desirable in many operating environments, but has heretofore been challenging to put into practice.

A further problem that has plagued HCCI systems relates to the lack of a natural control mechanism for accurately timing compression ignition. Spark ignited engines use a conventional spark generated within the cylinder when ignition is desired. Traditional compression ignition engines typically compress air to a temperature and pressure above the autoignition point, then control combustion timing by injecting fuel into the hot compressed air at a selected timing. In other words, the fuel ignites upon leaving the injector tip. The present disclosure provides a means for igniting the lean fuel and air mixture via compression ignition at a selected time during the engine cycle that is at least partially independent of piston position, overcoming both accuracy in timing and sufficiency of compression problems of earlier systems. In view of these operating principles, the present disclosure may be said to provide an embodiment that is a "Homogeneous Charge Controlled Autoignition" or HCCA engine. In the context of a fuel injected HCCI engine, for example, the present disclosure will allow a fuel injection relatively early in a given engine cycle, providing ample time for the fuel and air to mix, followed by a compression ignition at a selected time before, at or after the piston reaches top dead center, controlled with compression ignition initiation device 20.

The temperature of the fuel and air mixture at initiation of the main heat release event in a conventional HCCI cycle lies by definition at the spontaneous ignition temperature. In contrast, the temperature of the fuel and air mixture at initiation of the main heat release event in a conventional spark ignited (SI) cycle lies several hundred degrees from a spontaneous ignition temperature to prevent engine knock. Initiation of the main heat release event in a homogeneous charge controlled autoignition (HCCA) cycle according to the present disclosure, however, will typically occur within a temperature range that is between the SI and HCCI initiation of main heat release temperatures. As described herein, in a system according to the present disclosure, the relative degree of compression of the fuel and air mixture may be varied for different load conditions of engine 10. Accordingly, for relatively higher loads the initiation of the main heat release event may occur at a temperature that is relatively further from the spontaneous ignition temperature, whereas for relatively lower loads it may be relatively closer to the spontaneous ignition temperature.

Figure 3A:
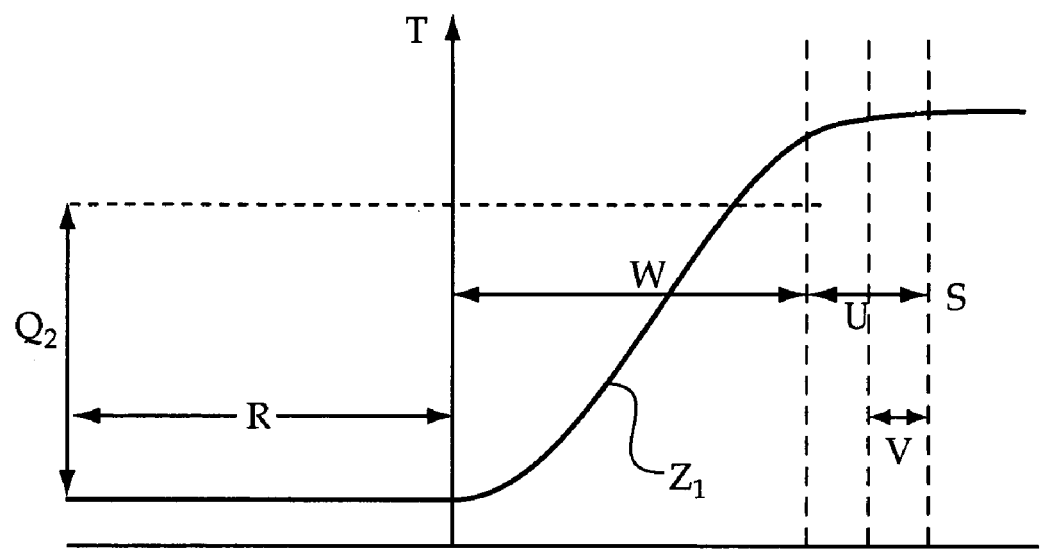
FIG. 3a is a concept illustration of a temperature difference through a flame in a spark-ignited engine.

Turning now to FIG. 3a, there is shown a concept illustration of a flame contour $Z_1$, showing schematically the difference in temperature across a flame in a cylinder of an SI engine during combustion. In FIG. 3a, T denotes a line representing relative temperature in the cylinder. R identifies an unburned zone of fuel and air mixture within the cylinder. Zone W is a preheat zone within the cylinder wherein the temperature is increasing due to the combusting fuel and air in adjacent zones and/or increasing cylinder pressure. Zone U represents the actual reaction zone, wherein the fuel and air are actively combusting, whereas Zone V represents the luminous zone, wherein residual combustion is taking place. Zone S is a burned zone wherein combustion of the fuel and air mixture is substantially completed. Range $Q_1$ represents the difference in temperature of the fuel and air mixture in the cylinder between an ignition point, the beginning of zone U in a left to right direction, and the temperature of unburned fuel and air in zone R.

Figure 3B:
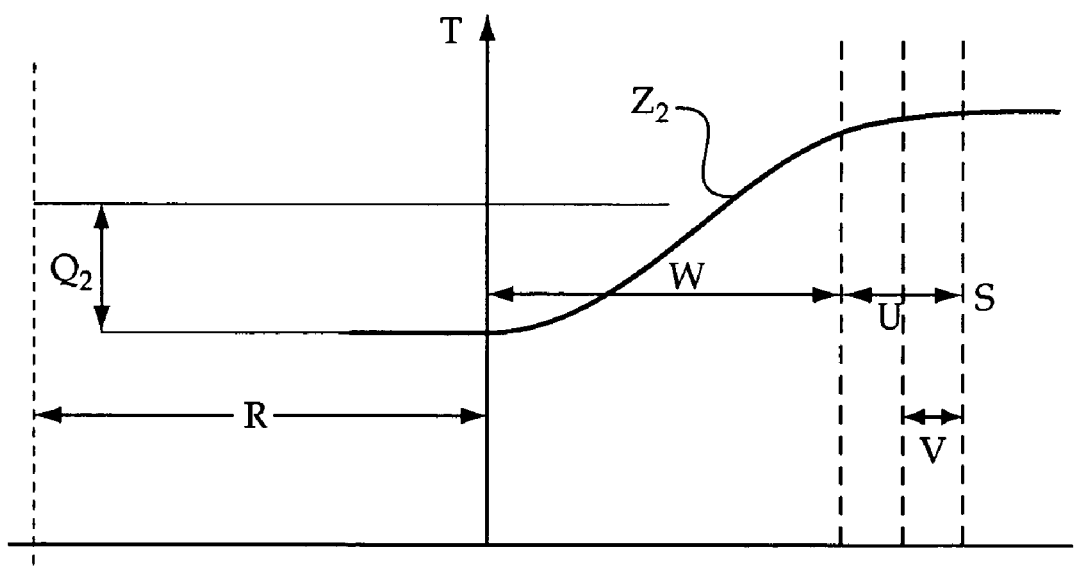
FIG. 3b is a concept illustration of a temperature difference through a flame in an engine according to the present disclosure.

Referring also to FIG. 3b, there is shown a concept illustration of a flame contour $Z_2$, showing schematically the difference in temperature across a flame during combustion in a cylinder of an HCCA engine according to the present disclosure. In FIG. 3b, letters alike to those used in FIG. 3a represent corresponding cylinder/flame zones. As shown, the portion of curve $Z_1$ within zone R of FIG. 3a is at a relatively lower unburned fuel and air temperature than the portion of curve $Z_2$ in the corresponding zone R of FIG. 3b.

The temperature difference between unburned fuel/air mixture and combusting fuel/air mixture is relatively smaller for an HCCA engine given that the initiation of the main heat release event occurs at a cylinder temperature that is relatively closer to a spontaneous ignition temperature than an SI engine. The temperature of the unburned fuel/air mixture in zone R of FIG. 3a will typically be relatively greater than that of zone R of FIG. 3b because the compression of the fuel/air mixture is relatively greater in the HCCA engine. Compressing fuel/air in a cylinder to a relatively higher degree has been shown to result in relatively greater flame speed and, in turn, flame stability. A relatively lean fuel/air mixture which is relatively highly compressed prior to ignition may thus have the flame speed and stability of a relatively richer mixture. The present disclosure thus provides enhanced flame stability in a lean fuel/air mixture, the thermal efficiency and emissions potential of HCCI operation, and easy control over ignition timing.

The present description is for illustrative purposes only, and should not be construed to narrow the scope of the present disclosure in any manner. Thus, those skilled in the art will appreciate that various modifications might be made to the presently disclosed embodiments without departing from the spirit and scope of the present disclosure. For instance, while much of the foregoing discussion describes a "fuel and air" mixture within cylinder 18, embodiments are contemplated wherein exhaust gas is recirculated to cylinder 18 to provide a diluent to a relatively lean mixture. Further, the present disclosure might be applied to other engine systems than those described herein as an auxiliary or supplementary compression ignition initiation device, allowing an engine to operate in a conventional compression ignition mode, an HCCA mode, or even potentially a mixed mode, using both HCCA and a diffusion burn in the same engine cycle. While it is contemplated that the present disclosure will be well suited to gaseous fuel engines, other engine types including diesel and gasoline engines may fall within its scope. Other aspects, features and advantages will be apparent from the examination of the attached drawing Figures and appended claims.

What is claimed is:

1. A compression ignition initiation device for an internal combustion engine comprising:
   a body defining a chamber and an outlet from said chamber, said body further including a fuel inlet separate from said outlet which is configured to supply a fuel to said chamber; and
   means, within said chamber, for generating a combustion-initiating shock front via combustion of a relatively more reactive fuel with air that propagates outwardly from said outlet to compression ignite a stoichiometrically lean mixture containing a relatively less reactive fuel and air in an engine cylinder, beginning at said outlet, which is at a compression state less than a compression ignition threshold.

2. The compression ignition initiation device of claim 1 wherein said chamber includes a throat having a converging geometry in a direction of said outlet.

3. The compression ignition initiation device of claim 2 wherein said means for generating comprises an internal combustion device.

4. The compression ignition initiation device of claim 3 wherein said means for generating comprises a spark gap disposed within said chamber.

5. A compression ignition initiation device comprising:
   a body defining a chamber and an outlet from said chamber, said chamber including a throat having a converging geometry in a direction of said outlet;
   an internal combustion device comprising a spark gap, within said chamber, for generating a combustion-initiating shock front from said outlet;
   a fuel inlet to said chamber;
   a hydrocarbon fuel source; and
   means for reforming hydrocarbon fuel, disposed between said fuel source and said fuel inlet.

6. The compression ignition initiation device of claim 5 wherein said means for reforming comprises a syngas generating porous combuster.

7. An internal combustion engine comprising:
   an engine housing defining at least one cylinder, and including a piston configured to compress a stoichiometrically lean mixture of fuel and air in said at least one cylinder up to but not exceeding a point less than a compression ignition threshold; and
   a compression ignition initiation device coupled with said at least one cylinder and comprising a combustion-initiating shock front generator fluidly connected with said at least one cylinder and configured to generate a combustion-initiating shock front which propagates outwardly from an outlet of said device to initiate compression ignition of the stoichiometrically lean mixture of fuel and air in said at least one cylinder.

8. The internal combustion engine of claim 7 wherein said compression ignition initiation device further comprises a body defining a pre-chamber having a throat fluidly connected with said at least one cylinder via an outlet.

9. The internal combustion engine of claim 8 wherein said shock front generator comprises a combustion device having a spark gap within said pre-chamber, and a fuel inlet separate from said outlet.

10. The internal combustion engine of claim 9 wherein the throat of said pre-chamber comprises a pressure focusing geometry.

11. A gaseous fuel internal combustion engine comprising:
   an engine housing defining at least one cylinder;
   a compression ignition initiation device coupled with said at least one cylinder and comprising a combustion-initiating shock front generator fluidly connected with said at least one cylinder and a body defining a pre-chamber having a throat fluidly connected with said at least one cylinder via an outlet, said shock front generator further comprising a combustion device having a spark gap within said pre-chamber;
   a fuel supply;
   a first fuel supply line from said fuel supply to said at least one cylinder;
   a second fuel supply line from said fuel supply to the pre-chamber of said compression ignition initiation device; and
   a fuel reformer coupled with said second fuel supply line.

12. The internal combustion engine of claim 11 wherein the throat of said pre-chamber comprises a pressure focusing geometry, and further comprising at least one variably timed gas exchange valve operably associated with said at least one cylinder.

13. A method of operating an internal combustion engine comprising the steps of:
   compressing a stoichiometrically lean mixture of fuel and air in an internal combustion engine cylinder up to but not exceeding a point less than a compression ignition threshold; and
   initiating ignition of the mixture at least in part by subjecting the mixture of fuel and air to a shock front, including propagating the shock front outwardly from an outlet to the cylinder of a compression ignition initiation device.

14. The method of claim 13 wherein the initiating step comprises generating the shock front via spark ignited fuel combustion in a pre-chamber of a compression ignition initiation device coupled with the engine.

15. The method of claim 14 wherein the initiating step comprises focusing gas pressure of the fuel combustion via a converging throat of the pre-chamber.

16. The method of claim 15 further comprising the steps of:
   supplying fuel to the cylinder prior to and/or during the compression step; and
   propagating the shock front through a combustion space of the cylinder to compression ignite fuel therein, after the initiating step.

17. A method of operating an internal combustion engine comprising the steps of:
   compressing a mixture of fuel and air in an internal combustion engine cylinder to a point less than a compression ignition threshold
   initiating ignition of the mixture at least in part by subjecting the mixture of fuel and air to a shock front, including propagating the shock front outwardly from an outlet to the cylinder of a compression ignition initiation device:
   supplying fuel to the cylinder prior to and/or during the compression step; and propagating the shock front through a combustion space of the cylinder to compression ignite fuel therein, after the initiating step:

wherein the initiating step comprises generating the shock front via spark ignited fuel combustion in a pre-chamber of a compression ignition initiation device coupled with the engine;

wherein the initiating step comprises focusing gas pressure of the fuel combustion via a converging throat of the pre-chamber: and wherein the supplying step comprises supplying a relatively less reactive fuel to the cylinder, the method further comprising the step of supplying a relatively more reactive fuel to the pre-chamber of the compression ignition initiation device.

18. A method of operating an internal combustion engine comprising:

compressing a mixture of fuel and air in an internal combustion engine cylinder to a point less than a compression ignition threshold;

initiating ignition of the mixture at least in part by subjecting the mixture of fuel and air to a shock front;

supplying a relatively less reactive fuel to the cylinder prior to and/or during the compressing step;

propagating the shock front through a combustion space of the cylinder to compression ignite fuel therein, after the initiating step;

wherein the initiating step comprises generating the shock front via spark ignited fuel combustion in a pre-chamber of a compression ignition initiation device coupled with the engine, the method further comprising a step of supplying a relatively more reactive fuel to the pre-chamber of the compression ignition initiation device, and focusing gas pressure of the fuel combustion via a converging throat of the pre-chamber;

wherein the compressing step comprises controlling compression of the mixture of fuel and air in the cylinder at least in part via at least one variably timed gas exchange valve of the cylinder.

19. The method of claim 18 wherein the compressing step further comprises:

compressing the mixture of fuel and air in the cylinder to a point relatively closer to the autoignition threshold, if the engine is in a lower portion of its load range; and compressing the mixture of fuel and air in the cylinder to a point relatively further from the autoignition threshold, if the engine is in a higher portion of its load range.

\* \* \* \* \*